UNITED STATES PATENT OFFICE 2,379,410

CATALYTIC PRODUCTION OF HYDROGENATED POLYMERS

Richard A. Bannerot, Martinez, Arthur H. Boultbee, Long Beach, and Bernard S. Greensfelder, San Francisco, Calif., assignors to Shell Development Company, San Francisco, Calif., a corporation of Delaware No Drawing. Application August 22, 1939,
Serial No. 291,364

9 Claims. (Cl. 260—683.6)

The present invention relates to the production of hydrogenated polymers, and more particularly pertains to a novel method of treating products of polymerization of unsaturated hydrocarbons such as olefins and diolefins, whereby their catalytic hydrogenation may be effected with a minimum of catalyst poisoning. Such a procedure is highly advantageous in that the active life of the hydrogenation catalyst may be greatly lengthened, thereby decreasing the interruptions ordinarily necessary for the removal of the poisoned or spent catalyst and for the recharging of the hydrogenation units with fresh or reactivated hydrogenation catalyst, and thus reducing the cost of operation. In one of its specific embodiments the invention relates to a process of polymerizing olefinic hydrocarbons, treating the obtained olefin polymers according to the present process to remove certain catalyst-poisoning compounds or impurities present and/or formed in such polymers, and subsequently subjecting the treated polymers, in the presence of hydrogen, to catalytic hydrogenation, thereby obtaining high yields of products of hydrogenation per unit of catalyst employed.

The present invention may be advantageously applied in connection with catalytic hydrogenation of a wide variety of products of polymerization. Thus, suitable starting materials which may be advantageously treated according to the present process (and then catalytically hydrogenated) include addition products of an olefin with a like olefin (i. e., products of co-polymerization) or with a different olefin (i. e., products of inter-polymerization), or mixtures of products of co-polymerization and inter-polymerization.

The unsaturates employed for the preparation of the desired polymer to be treated according to the present process, may be of any degree of reactivity, although the process is particularly advantageous in its application to the hydrogenation of products of inter-polymerization of olefins, as this will be described more fully hereinbelow. Generally speaking, however, ethylene and/or secondary-base olefins such as propylene, 1-butene, 2-butene, 1-pentene, 2-pentene, 3-methyl-1-butene, and the like, and/or tertiary olefins including isobutylene, 2-methyl-1-butene, 2-methyl-2-butene and similar hydrocarbons containing a tertiary unsaturated carbon atom, and diolefins may be used as the starting materials for the production of the polymers to be treated and hydrogenated according to the present process. The unsaturated compounds used as such starting material may be conveniently derived from mineral oils such as petroleum, shale oil and the like, or from mineral oil products, or natural gas, or coal, peat, and similar carboniferous natural or artificial materials, as well as from vegetable oils, synthetic oils, fats and waxes. The olefins employed may be in a pure state or commingled with other relatively inert hydrocarbons or the like, and may be of natural occurrence or the result of catalytic dehydrogenation, vapor or liquid phase, thermal or catalytic cracking, or other pyrogenetic treatment.

Any conventional or suitable method of polymerization may be used to prepare the polymers to be treated and hydrogenated according to the present invention. For example, resort may be had to pressure heating, or to treatment with zinc chloride, boron fluoride, phosphoric acid, on a carrier such as pumice, and like polymerization agents of high activity, these methods of polymerization usually resulting in the production of highly mixed polymer products. If, on the other hand, individual hydrocarbons or only isomeric mixtures are desired, the polymerization may be effected by first selectively absorbing the chosen olefin or olefins in a suitable acid-acting medium, such as an aqueous solution of sulphuric acid, phosphoric acid, benzene-sulfonic acid, and the like, and then heating the resulting absorption product. The time of contact with such acid agents which will be required for absorption and/or polymerization of the desired olefin or olefins will depend on the character of the olefins involved, the nature and concentration of the polymerization agent used, and the temperature at which the operations are effected. For the production of substantially pure products of polymerization, as, for example, when diisobutylene is to be produced from olefins containing isobutylene, it is preferable that the time of contact and the temperature of operation be adjusted so that only negligible conversion of the less reactive olefins will occur.

Although the invention is applicable in connection with either type of polymerization process, it is particularly advantageous in its application to the vapor phase hydrogenation of polymers or polymer mixtures in the gasoline range. Thus, the invention finds particular use in the vapor phase catalytic hydrogenation of polymers comprising or containing polymers of one or more of the butylenes, these butylene polymers resulting either from co-polymerization of, for example, isobutylene or from the inter-polymerization of isobutylene with 1-butene or 2-butene. Also, the invention is applicable to the hydrogenation of higher polymers such as triisobutylene. The treatment and catalytic hydrogenation of other products of polymerization is also within the scope of this invention.

The hydrogenation may be effected in the presence of any suitable catalyst. Thus, activated nickel, such as reduced and finely divided nickel with or without a support, iron, cobalt, metals of the platinum group, particularly platinum and palladium, copper, chromium, manganese, titanium, molybdenum, vanadium, tungsten and thorium, are examples of metal catalysts which are particularly suitable. However, other hydrogenation catalysts may also be employed. The catalyst may be used alone as an individual metal or as a compound thereof, or as a mixture of metals, or as a mixture of metals and compounds, for example, nickel and chromium, nickel and molybdenum, nickel and boron oxide, nickel and silica, or the like, prepared, for example, by the reduction of nickel silicate, nickel borate, etc., also, nickel carbonate, nickel formate or nickel hydroxide. In the preparation of the catalyst advantage may be taken of the promoter action of small amounts of difficultly reducible oxides of heavy or noble metals, or the like, such as thoria, ceria, zirconia and titania, which are particularly useful as promoters for nickel.

The hydrogenation promoting catalytic metal, material or materials may be prepared in any suitable manner and employed per se or incorporated with or deposited upon an inert substance or support which serves as a carrier. As such, it is possible to use pumice, calcium carbonate, silica gel, kieselguhr, infusorial earth, glass, porcelain, unglazed refractories, asbestos, charcoal, etc. Also, the catalysts may be disposed on a metal support whereby the heat conductivity of the catalyst mass may be improved and control of the catalyst temperature facilitated. The use of supported hydrogenation catalysts is particularly efficacious when the hydrogenation operations are to be effected in the vapor phase.

It is well known that polymers of the class described are usually contaminated with sulphur-containing impurities, and that the catalytic hydrogenation of such impurity-containing polymers is highly inefficient because these impurities act as poisons, thereby relatively quickly deactivating the hydrogenation catalyst. This is particularly true in the cases of vapor phase catalytic hydrogenation effected within the relatively limited temperature range in which practical rates of hydrogenation are attainable without substantial depolymerization or other undesirable decompositions. The interruptions of the hydrogenation operations necessary for replacing or regenerating the hydrogenation catalysts, greatly increase the cost of hydrogenating the olefin polymers. Therefore, it has been previously proposed to prevent or at least decrease the frequency of such interruptions by treating the olefin polymers, prior to their hydrogenation, with agents capable of eliminating or removing the greater portion of such catalyst-poisoning sulphur-containing compounds from the olefin polymers to be hydrogenated. Also, methods and means have been previously provided for treating the olefin polymers so as to convert the active or catalyst-poisoning sulphur-containig impurities into substances which are relatively more inert at the hydrogenating temperatures and pressures, thereby decreasing the poisoning effect of such sulphur-containing organic impurities on the hydrogenation catalyst so that its active life may thus be lengthened. In some instances the catalytic hydrogenation of the olefinic polymers containing such active sulphur compounds has been effected in the presence of substances which inhibited the poisoning of the hydrogenation catalyst. In other words, all of these methods of operation or treatment were directed to decreasing the undesirable poisoning effect of the active sulphur-containing compounds on the catalysts employed for the catalytic hydrogenation of the olefin polymers, thereby increasing the life of the catalyst and decreasing the frequency of interruptions necessary for the replacing or regenerating of the poisoned or de-activated hydrogenation catalyst.

It has now been discovered that polymers of the class described above, when subjected to hydrogenation in the presence of the hydrogenating catalysts, effect a relatively quick de-activation of such catalysts even when the polymers have been preliminarily treated according to any of the above-outlined processes for the complete or substantial removal or de-activation of their active sulphur-containing compounds. In other words, polymers treated for the substantial removal of the catalyst-poisoning sulphur compounds, still contain a substance or substances which cause a relatively rapid de-activation of the catalyst used for the hydrogenation of such polymers. It has been further discovered that such catalyst poisoning is effected by certain impurities now believed to comprise active oxygen-containing compounds present or formed in the olefin polymers prior to their hydrogenation. Although the exact nature and chemical formula of these undesirable compounds is not known at the present time, it is believed that they are of the peroxide type and that they contain the

group in the molecule.

It has also been found that these active oxygen-containing compounds (which, for purposes of brevity and simplicity, are termed hereinbelow as "peroxides"), when present in the unsaturated polymers to be hydrogenated by the known methods of catalytic hydrogenation, effect a relatively rapid deactivation or poisoning of the hydrogenation catalyst, thereby greatly decreasing the active hydrogenating life of the catalyst and the yield of hydrogenated products obtainable per unit of catalyst employed. Such decrease in catalyst life and obtainable yields obviously increases the cost of operations. Therefore, the main object of the present invention is to obviate the above and other defects, and to provide a process of treatment of the polymers whereby the "peroxides" may be removed, destroyed or decomposed prior to the time when the polymers are catalytically hydrogenated, thereby increasing the active life of the hydrogenation catalyst, as well as the yield of products of hydrogenation which may be obtained per unit catalyst employed for such catalytic hydrogenation of the treated polymers.

It has been further discovered that the above-outlined active catalyst-poisoning oxygen-containing impurities may be substantially completely removed from the polymers of the class described, and that the effective life of the hydrogenation catalyst employed for the hydrogenation of the thus treated olefin polymers may then be greatly increased or lengthened. This treatment, which is to be effected prior to the hydrogenation step, may be realized, according to this invention, by distillation, and preferably in the presence of nitrogen or a like inert gas. Thus, it was found that the relatively higher boiling polymers, and particularly those boiling above about 115° to 125° C., have a greater tendency to contain and/or form the undesirable "peroxides," as compared to the peroxide present and/or formed in polymers boiling below the above-mentioned range. Thus, as a non-limiting example, a polymer obtained by the polymerization of a butane-butylene mixture with a phosphoric acid catalyst, was fractionated. It was found that, after exposure to light and air for a given period of time, the peroxide content of the polymers boiling above about 240° F. (115° C.) was, on an average, between 6 and 12 times greater than that of the fraction distilling below the above temperature. As stated above, and as brought out in the examples hereinbelow, polymers having relatively higher peroxide contents, when subjected to catalytic hydrogenation, effect a relatively rapid de-activation of the catalyst, so that the yield of products of hydrogenation obtainable per unit of hydrogenation catalyst employed is much lower as compared to yields attainable from the catalytic hydrogenation of olefin polymers or their fractions containing substantially no, or, at least, relatively smaller quantities of such "peroxides." Therefore, by subjecting the olefin polymers to a distillation to recover an overhead fraction having a lesser tendency to form the undesirable oxygen-containing impurities, and by subjecting this distillate fraction to catalytic hydrogenation, it is possible to materially increase the effective life of the hydrogenation catalyst. As mentioned, the distillation step should be preferably effected in the presence of nitrogen or a like inert gas, thus inhibiting the "peroxide" formation in the distilled fraction to be hydrogenated. For the same reason, it is advantageous to effect the catalytic hydrogenation substantially immediately or soon after such distillation.

The present invention may therefore be broadly stated to reside in removing the active oxygen-containing catalyst-poisoning impurities from unsaturated polymers to be catalytically hydrogenated. The invention further includes a process of producing high yields of products of hydrogenation of olefin polymers, this process including the steps of forming the olefin polymers, removing the peroxides present and/or formed therein, and then subjecting these polymers to a catalytic hydrogenation in the presence of effective quantities of hydrogen. As stated, the removal of the catalyst-poisoning active oxygen-containing compounds may be realized by subjecting the polymers to a distillation preferably in the presence of nitrogen or a like inert gas, such distillation removing the relatively higher boiling polymers containing the major quantities of the above-described peroxide impurities. The invention, therefore, further includes the process of treating polymers for the substantial removal of their peroxides by fractional distillation to remove the peroxide-containing heavy ends, thereby substantially lowering the peroxide content of the unsaturated polymers, which may then be efficiently hydrogenated in the presence of active hydrogenation catalysts. The hydrogenation step is preferably effected substantially immediately after the recovery of the desired polymer fraction containing relatively lower percentages of "peroxides."

The polymers to be treated according to the present invention should preferably be substantially free from catalyst-poisoning sulphur-containing impurities. Therefore, the process includes the preliminary treatment of the unsaturates and/or of the polymers to remove such undesirable sulphur bodies or to render them inactive so far as their poisoning effect on the hydrogenation catalyst is concerned.

It has been stated that the exact formula of the active catalyst-poisoning oxygen-containing impurities present and/or formed in the unsaturated polymers is not known at the present time, but that it is believed that these impurities contain the

group or radical in the molecule. The presence of these compounds in the polymers may be determined more or less quantitatively by various methods. One of these methods of quantitative determination of the "peroxides" in the polymers is described by Messrs. J. A. C. Yule and C. P. Wilson, Jr., in the Industrial and Engineering Chemistry, vol. 23, pp. 1254–59 (1931), this method being based on the fact that the organic peroxides oxidize ferrous ions to ferric ions. The ferric salt produced by the treatment of the peroxide-containing polymers with the Yule and Wilson reagent, is then titrated by means of a 0.01N solution of titanous chloride, and the result is usually expressed in gram equivalents of active oxygen per 1,000 liters of polymer, or as its "peroxide number." As will be shown by the following examples, the peroxide number is an indicia of the peroxide content of the polymer. Polymers having a relatively higher peroxide number, when subjected to catalytic hydrogenation, cause a relatively faster de-activation or poisoning of the hydrogenation catalyst, so that the yield of products of hydrogenation per unit volume or weight of the catalyst is much lower than that obtainable from the catalytic hydrogenation of unsaturated polymers containing no, or at least lesser quantities of the "peroxides" and, therefore, having lower peroxide numbers.

The following detailed examples illustrate the application of the process of the invention to the catalytic hydrogenation of olefin polymers, it being clearly understood that these examples are merely illustrative and not to be regarded as limiting the scope of the invention.

*Example I*

A polymer product obtained by the catalytic treatment with a phosphoric acid catalyst of a butylene-containing hydrocarbon fraction, and containing about 0.003% sulphur, was distilled to obtain three fractions, the first of which distilled over below 115° C., the second between 115°–124° C., and the third comprising the bottoms boiling above 124° C. The average peroxide numbers of these fractions (after exposure to oxygen for one hour) were about 11, 38 and 130, respectively.

*Example II*

The polymer product obtained by the above-described polymerization with a phosphoric acid catalyst, and having a 0.0051% sulphur content, was hydrogenated in the vapor phase under the following conditions: The polymer vapor was commingled with hydrogen in a 1.5 molal ratio of hydrogen to polymer, and conveyed at a feed rate of about 30 c. c. per hour and at a temperature of 180° to 190° C. over 100 c. c. of a nickel hydrogenation catalyst. The conversion of the first 434 c. c. of the polymer to the corresponding saturated hydrocarbons was 99% or higher. However, further passage of the hydrogen-polymer mixture over the catalyst showed a steady drop in the per cent yield of products of hydrogenation, this conversion dropping to 91% when 1,500 c. c. of polymers were treated, and 82.2% when about 2,000 c. c. of product were obtained.

*Example III*

A portion of the olefin polymer obtained for the hydrogenation as described in the previous example was first distilled to recover therefrom the fraction boiling between 104° and 115° C. This fraction was then hydrogenated in the vapor phase under substantially the same conditions as those recited in Example II. The per cent conversion of the first 1,734 c. c. of the product was 99% or higher. The next 400 c. c. of product removed from the hydrogenation unit showed a 97.5% conversion. Even when the total throughput was 3,700 c. c. of polymer, the per cent conversion thereof into saturated products was still above 91%. It is to be noted that, immediately after distillation, this 104° to 115° C. fraction had a peroxide number of about 1, as compared to a peroxide number of about 9 to 10 for the higher boiling residue.

Comparing the last two examples, it is seen that the yield of products of hydrogenation per unit volume of catalyst is increased by about 250% when the heavier polymers boiling above 115° C. were removed. This increase in the effective life of the hydrogenation catalyst is clearly attributable to the fact that the 104° to 115° C. fraction forms "peroxides" at a much slower rate, it being noted, as shown by Example I, that the polymer fraction boiling below 115° C., when subjected to air and light, has a peroxide number much lower than that of the heavier polymer fraction or fractions. Also, the 104° to 115° C. fraction, immediately after distillation, had a peroxide number approaching zero, the peroxides present in the polymer distilled having been concentrated in the residual fraction boiling above 115° C.

*Example IV*

An olefin polymer fraction, having a 0.0027% sulphur content, was exposed to air and light for about 4 hours, at the end of which the peroxide number rose to about 17.6. This fraction was then divided into two parts. The first part was subjected to vapor phase hydrogenation over a nickel catalyst. The yield of octanes was 130 gallons per pound of Ni. The second part was first distilled under nitrogen until 95% was obtained as an overhead fraction. This overhead fraction had a 0.7 peroxide number, and its hydrogenation under conditions identical with those employed for the treatment of the undistilled fraction, showed a 500 gallon yield of octanes per pound of Ni, or an increase of about 285% in the effective life of the catalyst.

Although the hydrogenations described in the above examples were effected in the vapor phase and with a nickel catalyst, it is to be understood that other catalysts may be used and that the general procedure is the same and equally applicable when liquid phase methods of operation are used. Also, the invention may be executed in connection with hydrogenations in a batch, intermittent or continuous manner.

It was pointed out above that the distillation step is preferably effected in the presence of nitrogen or an insert gas, which inhibits the peroxide formation in the distilled fraction to be hydrogenated. This inert gas, in fact, excludes oxygen from the distillation zone. Therefore, it may be stated that this preliminary distillation step should be effected in the absence of any free oxygen which will otherwise cause the formation of the outlined undesirable impurities.

We claim as our invention:

1. A process for producing octanes from hydrocarbon mixtures containing butylenes which comprises catalytically polymerizing the butylenes to produce polymers comprising octylenes having a relatively wide boiling range and containing active oxygen-containing impurities capable of poisoning a hydrogenation catalyst, fractionally distilling said polymers to recover the fraction boiling below about 115° C., said fraction containing substantially none of the aforementioned catalyst-poisoning impurities, and subjecting said recovered polymer fraction, in the presence of effective quantities of hydrogen and under hydrogenating conditions, to the action of a hydrogenating catalyst, thereby producing a high yield of octanes and simultaneously greatly increasing their yield per unit volume of catalyst employed.

2. The process according to claim 1, wherein the polymer fraction boiling below about 115° C. is subjected to the hydrogenation step substantially immediately after its recovery by distillation, thereby inhibiting the formation of additional oxygen-containing impurities in the polymer to be hydrogenated.

3. A process for producing hydrogenated polymers from olefins which comprises catalytically polymerizing said olefins to produce polymers boiling at different temperatures and containing active oxygen-containing impurities capable of poisoning a hydrogenation catalyst, fractionally distilling said olefins to separately recover an overhead fraction substantially free from said catalyst-poisoning impurities, commingling said overhead fraction with hydrogen, and contacting the polymer-hydrogen mixture with a hydrogenation catalyst under hydrogenating conditions, thereby obtaining a high yield of hydrogenated polymers per unit volume of hydrogenation catalyst employed.

4. The process according to claim 3, wherein the overhead fraction subjected to the catalytic hydrogenation comprises the polymers boiling below about 115° C.

5. In a process for producing products of hydrogenation of olefin polymers, the steps of effecting an inter-polymerization of olefins, said products of polymerization comprising unsaturated hydrocarbons boiling over a relatively wide temperature range and containing active oxygen-containing impurities capable of poisoning a hydrogenation catalyst, distilling said polymers to recover an overhead fraction substantially free of said impurities, and subjecting said overhead fraction to catalytic hydrogenation in the presence of effective quantities of hydrogen, thereby obtaining a high yield of hydrogenated polymers per unit catalyst employed.

6. The process according to claim 5, wherein the distillation of the impurity-containing polymers is effected in the absence of oxygen and in the presence of an inert gas, thereby preventing the reformation of the oxygen-containing catalyst-poisoning impurities in the polymers to be hydrogenated.

7. In a catalytic process of producing hydrogenated polymers from unsaturated hydrocarbons, the steps of polymerizing said unsaturates to produce polymers adapted to form active oxygen-containing compounds capable of poisoning a hydrogenation catalyst, fractionally distilling said polymers to remove substantial proportions of said active oxygen-containing compounds, and contacting said treated polymers, substantially free from said impurities, with a hydrogenation catalyst, in the presence of effective quantities of hydrogen and under hydrogenation-promoting temperatures and pressures, said removal of the active oxygen-containing compounds increasing the effective life of the catalyst.

8. In a catalytic process of producing hydrogenated polymers from olefins, the steps of desulphurizing said olefins, polymerizing the desulphurized olefins to produce substantially sulphur-free polymers boiling at various temperatures and containing active oxygen-containing impurities capable of poisoning a hydrogenation catalyst, fractionally distilling said polymers to recover an overhead fraction substantially free from said active oxygen-containing impurities, and subjecting said overhead fraction to catalytic hydrogenation.

9. A process for producing octanes from hydrocarbon mixtures containing butylenes, which comprises desulphurizing said hydrocarbon mixtures, catalytically polymerizing the butylenes therein to produce substantially sulphur-free polymers containing octylenes, said polymers having a relatively wide boiling range and containing active oxygen-containing impurities capable of poisoning a hydrogenation catalyst, fractionally distilling said polymers in the substantial absence of oxygen to recover a fraction boiling below 115° C., said fraction containing only limited amounts of the aforementioned catalyst-poisoning impurities, and subjecting said recovered polymer fraction, in the presence of effective quantities of hydrogen and under hydrogenating conditions, to the action of a hydrogenation catalyst, thereby producing a high yield of octanes and simultaneously greatly increasing their yield per unit volume of catalyst employed.

RICHARD A. BANNEROT.
ARTHUR H. BOULTBEE.
BERNARD S. GREENSFELDER.